(12) United States Patent
López Medrano

(10) Patent No.: US 12,521,526 B2
(45) Date of Patent: Jan. 13, 2026

(54) CATHETER APPLICATOR AND METHOD OF USE

(71) Applicant: FUNDACIÓN PARA LA INVESTIGACIÓN BIOMÉDICA DEL HOSPITAL 12 DE OCTUBRE, Madrid (ES)

(72) Inventor: Francisco López Medrano, Madrid (ES)

(73) Assignee: FUNDACIÓN PARA LA INVESTIGACIÓN BIOMÉDICA DEL HOSPITAL 12 DE OCTUBRE, Madrid (ES)

(*) Notice: Subject to any disclaimer, the term of this patent is extended or adjusted under 35 U.S.C. 154(b) by 841 days.

(21) Appl. No.: 17/842,084

(22) Filed: Jun. 16, 2022

(65) Prior Publication Data
US 2022/0313949 A1   Oct. 6, 2022

Related U.S. Application Data

(63) Continuation-in-part of application No. PCT/ES2020/070799, filed on Dec. 17, 2020.

(30) Foreign Application Priority Data

Dec. 18, 2019  (ES) .............. ES201931127

(51) Int. Cl.
*A61M 25/01* (2006.01)
(52) U.S. Cl.
CPC ................. *A61M 25/013* (2013.01)

(58) Field of Classification Search
CPC ............ A61M 25/13; A61M 2025/024; A61M 5/1418; A61M 39/284; F16L 32/02; H02G 3/32
See application file for complete search history.

(56) References Cited

U.S. PATENT DOCUMENTS

| | | | |
|---|---|---|---|
| 3,537,451 A | 11/1970 | Beck et al. | |
| 3,651,807 A | 3/1972 | Huggins | |
| 4,191,186 A | 3/1980 | Keeler | |
| 5,535,970 A * | 7/1996 | Gobbi | F16L 3/13 248/74.1 |
| 6,517,522 B1 | 2/2003 | Bell et al. | |

FOREIGN PATENT DOCUMENTS

| | | |
|---|---|---|
| EP | 0723464 A1 | 7/1996 |
| ES | 2595486 A1 | 12/2016 |
| FR | 1534122 | 7/1968 |
| WO | 9014124 A1 | 11/1990 |
| WO | 9602294 A1 | 2/1996 |
| WO | 0174416 A1 | 10/2001 |
| WO | 2016020923 A2 | 2/2016 |
| WO | 2017197367 A1 | 11/2017 |

OTHER PUBLICATIONS

International Search Report, PCT/ES2020/070799, Mar. 22, 2021, 4 pages.

* cited by examiner

*Primary Examiner* — Laura A Bouchelle
(74) *Attorney, Agent, or Firm* — Edell, Shapiro & Finnan, LLC

(57) ABSTRACT

A catheter applicator is disclosed which allows an aseptic and stable catheter insertion and handling. The applicator comprises, in particular, clamping members cooperating with a bearing surface for handling a catheter. A method of using the applicator is further provided.

19 Claims, 7 Drawing Sheets

CATHETER APPLICATOR AND METHOD OF USE

CROSS-REFERENCE TO RELATED APPLICATIONS

This application is a continuation-in part of International Appl. No. PCT/ES2020/070799, filed Dec. 17, 2020, which claims the benefit and priority to Spanish Appl. No. P201931127, filed Dec. 18, 2019.

FIELD

The present disclosure relates to an instrumentation for the insertion of a catheter into a blood vessel or for handling thereof under sterile conditions once inserted. More specifically, the disclosure relates to an auxiliary device or catheter applicator to be employed during insertion or handling and removal of a catheter into a blood vessel and which is intended to minimize the risks of infection by phlebitis or bacteremia associated with catheter infection, in particular, in peripheral venous catheters.

The disclosure further relates to a method of use of the applicator device.

BACKGROUND

Recommendations on catheter insertion are universally applicable regardless of the nursing or medical staff inserting the catheter and regardless of where the procedure is performed. Currently, with the existing instruments, it is necessary for the healthcare personnel to touch a catheter proximal area with their gloved fingers, in most cases using non-sterile gloves, either when performing the insertion technique, or when removing the needle, or when connecting to a connector, such as for example a saline system, a needleless connector, a three-way stopcock or a plug, which could result in the catheter body being thus contaminated.

Venous catheter cannulation auxiliary devices intended for protection of healthcare personnel, and others that help to optimize the procedure by means of systems for fixation and stabilization of the catheter on the patient are known in the art. However, no system is known specifically designed to decrease the incidence of bacteremia and peripheral catheter-associated infections throughout the entire cycle of catheter insertion and subsequent handling. Some parts of the present description relate to a catheter and portions of a catheter. For example, in the present description, distal portion or area of a catheter is understood as a portion that would be inserted under the skin of a patient's limb upon insertion of the catheter. In the present description, a proximal portion or area of a catheter is understood to be a portion attached to the distal portion and that would be outside the skin of a patient's limb upon insertion of the catheter. During a routine use of a catheter, the proximal portion is the portion that is handled or held for insertion of the catheter by healthcare personnel.

BRIEF DESCRIPTION OF THE DRAWINGS

To supplement the description of the disclosure and in order to assist in a better understanding of the features of the disclosure, a set of illustrative and non-limiting drawings is enclosed where the following has been depicted.

DETAILED DESCRIPTION

Figure 1:
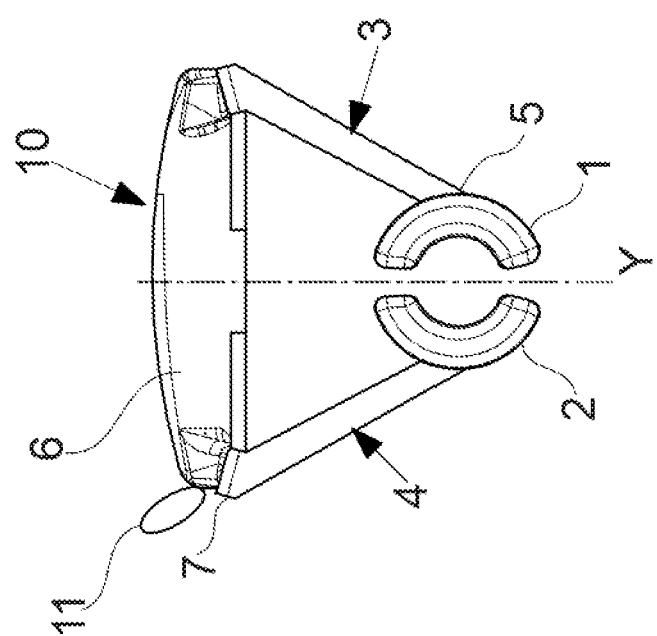
FIG. 1 shows a top view of an example of an applicator device.

FIG. 1 shows an applicator (10) that comprises two catheter catching members (1, 2) symmetrically separated with respect to a central axis (Y), two clamping members (3, 4) with respective first ends (5), a bearing surface (6) joined to respective second ends (7) of the clamping members (3, 4) and one gripping flap (11). In a first aspect, an auxiliary device for a catheter or catheter applicator (10) is provided and shown in FIG. 2, wherein the catheter applicator (10) comprises:

two catheter catching members (1, 2) symmetrically separated with respect to a central axis (Y) and configured for cooperatively coupling to a catheter proximal portion;

characterized in that the applicator further comprises:

two clamping members (3, 4) symmetrically separated with respect to the central axis (Y) and configured to clamp the applicator and attached to respective catheter catching members (1, 2) by respective first ends (5) of the clamping members (3, 4) through force transmission branches (8);

a bearing surface (6) joined to respective second ends (7) of the clamping members (3, 4), said bearing surface (6) forming an angle between 70° and 110° with respect to the central axis (Y), such that, following the central axis (Y), the clamping members (3, 4) are comprised between the catheter catching members (1, 2) and the bearing surface (6), at least one gripping flap (11) between the clamping members (3, 4) and the bearing surface (6);

wherein the bearing surface (6) and the clamping members (3, 4) cooperate to allow the catheter catching members (1, 2) to be brought closer together so as to allow a catheter to be caught and to allow the catheter catching members (1, 2) to move away from each other so as to permit a catheter to be released.

Figure 2:
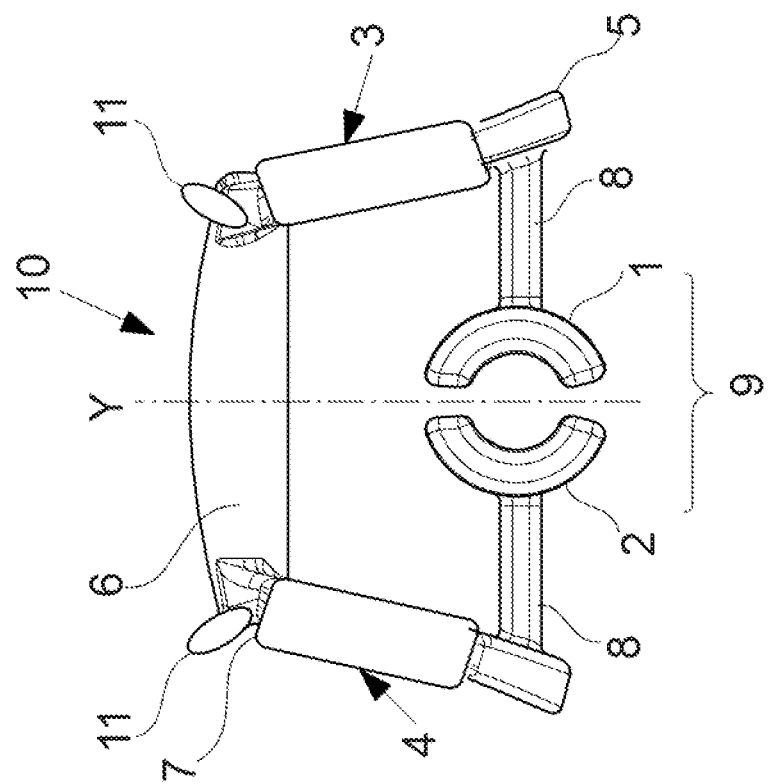
FIG. 2 shows a top view of a first example embodiment of an applicator device.

The catheter catching members (1, 2) allow a catheter to be caught at its proximal portion. As shown in FIG. 2, the catching members (1, 2) are configured for cooperatively coupling to a catheter proximal portion. The catching members may comprise two independent elements or one element with two parts joined by a connecting bridge, such that a catheter proximal portion can be caught or clamped by both members in cooperation. The cooperation may be interpreted such that the two catching members cooperate by applying a force or power along a direction towards the central imaginary axis (Y) for catching a catheter.

The two clamping members (3, 4) symmetrically separated with respect to the central axis (Y) are configured to hold the applicator, in particular with user's fingers with or without gloves and in a particular case with non-sterile gloves or with a robotic arm. The clamping members are attached to respective catheter catching members (1, 2) by respective first ends (5) of the clamping members (3, 4) such that a third level or degree clamp or lever would be provided in which the clamping members (3, 4) would be the power arm of said third level lever, the bearing surface (6) would be the fulcrum of said lever and the catheter caught by the catching members (1, 2) would be the resistance.

The applicator (10) further comprises a bearing surface (6) joined to respective second ends (7) of the clamping members (3, 4), said bearing surface (6) forming an angle between 70° and 110° with respect to the central axis (Y), being essentially perpendicular to said axis, such that, following the central axis (Y), or along the direction of the central axis (Y), the clamping members (3, 4) are comprised between the catheter catching members (1, 2) and the bearing surface (6). Such configuration makes it possible to perform a catheter catching and releasing action by applying pressure on the bearing surface (6) and the clamping members (3, 4), or on the bearing surface (6), for example, with user's fingers with or without gloves and in a particular case with non-sterile gloves or with a robotic arm.

At least one of the clamping members (3, 4) comprises at least one first flap (11) at a second end (7). A first flap (11) enables optimal gripping of the clamping members by applying a pressing force on the bearing surface (6) for opening or moving the catching members (1, 2) away from each other. The at least one first flap (11) allows opening the applicator (10) by simulating a first level or degree lever in which the load represented by the catching members (1, 2) are located at one side of the fulcrum represented by a central portion and coincident with the central axis (Y) of the bearing surface (6) and the force or power, represented by flap (11) at the other. Opening of the applicator (10) would induce the central portion and coincident with the central axis (Y) of the bearing surface (6) to be bent or sunk towards the catching members (1, 2) when opening the applicator so that said central portion would act as a fulcrum of the above-described lever.

Furthermore, the bearing surface (6) and the clamping members (3, 4) cooperate for allowing the catheter catching members (1, 2) to be brought closer together so as to allow a catheter to be caught and the catheter catching members (1, 2) to move away from each other so as to allow a catheter to be released. In a particular example, the bearing surface (6) cooperates with clamping members (3, 4) to act as a first-degree lever fulcrum in opening the applicator. In a particular example, the bearing surface (6) cooperates with the clamping members (3, 4) to act as a second-degree lever fulcrum in closing the applicator. In one particular example, by pressing one or two first flaps (11) and pressing at the same time on the bearing surface to allow the latter to sink towards the catching members, opening or moving of the catching members (1, 2) away from each other is allowed; said opening may be such that a catheter proximal portion can be placed between the catching members (1, 2). Next, closing or bringing the catching members (1, 2) closer together is enabled by holding and applying pressure on the clamping members (3, 4) along a direction towards the central axis (Y) and thus towards the axis which would pass through the catheter proximal portion and, at the same time, releasing the pressure on the bearing surface (6). Closing the catching members (1, 2) may be such that a catheter proximal portion can be caught between the catching members (1, 2). Once the catheter is caught, a pressure on the bearing surface (6) allows the applicator-catheter assembly to be restrained on a surface, for example, on a patient's limb. Such restraining makes it possible handling the catheter by preventing twisting of the catheter about its own longitudinal axis during connection to a connector such as, for example, a serum system, a needleless connector, a plug, or a three-way stopcock.

The clamping members (3, 4) are attached to respective catheter catching members (1, 2) through the force transmission branches (8). The force transmission branches (8) allow pressing force on the clamping members (3, 4) to be transmitted to the catheter catching members (1, 2) and consequently on a catheter caught by the catching members. The length of said branches may be modified according to the design, the utility, and the desired final separation between the catching members (1, 2) and the clamping members (3, 4) so as to provide for a separation, for example between contaminated user's fingers and a catheter that it is to be inserted aseptically into a patient.

The applicator (10) provided in the present description allows a catheter aseptic handling since the configuration of the mechanical elements and parts, as well as the cooperation thereof, make it possible to operate with a catheter without the need for bringing it into contact with handling elements, in particular with user's fingers with or without gloves and in a particular case with non-sterile gloves or with a robotic arm.

Thus, the catheter applicator (10) of the present description may comprise:
two catheter catching members (1, 2) symmetrically separated with respect to a central axis (Y) and configured for cooperatively coupling to a catheter proximal portion;
two clamping members (3, 4) symmetrically separated with respect to the central axis (Y) configured to clamp the applicator and attached to respective catheter catching members (1, 2) by respective first ends (5) of the clamping members (3, 4);
a bearing surface (6) joined to respective second ends (7) of the clamping members (3, 4), said bearing surface (6) forming an angle between 70° and 110° with respect to the central axis (Y), such that, following the central axis (Y), the clamping members (3, 4) are comprised between the catheter catching members (1, 2) and the bearing surface (6),
at least one gripping flap (11) between the clamping members (3, 4) and the bearing surface (6);
wherein the bearing surface (6) and the clamping members (3, 4) cooperate to allow the catheter catching members (1, 2) to be brought closer together so as to allow a catheter to be caught and/or to allow the catheter catching members (1, 2) to move away from each other so as to permit a catheter to be released;
and wherein the clamping members (3, 4) are attached to respective catheter catching members (1, 2) through force transmission branches (8).

Among the advantages provided by the disclosure, the device allows not only an aseptic insertion of a catheter into a line, for example, into a patient's peripheral vein, but also an aseptic and safe catheter handling, once inserted, by avoiding twisting of the catheter about its longitudinal axis during connection to a connector such as, for example, a serum system, a needleless connector, a plug, or a three-way stopcock. Twisting would be avoided by pressing on the bearing surface (6), for example, by a non-dominant hand finger while the connecting catheter would be connected by a dominant hand. Such clamping during catheter connection to a connector would not be possible with prior art applicators since with the applicator of the present disclosure it is possible to provide stability to the applicator-catheter assembly as it is possible applying a clamping force on the clamping members (3, 4) and thus on the catheter when inserted on a surface, for example a patient's limb, while pressing on the bearing surface (6). Advantageously the applicator may further comprise support legs for improved support as shown attached to the first ends (5) shown in FIG. 2.

In particular examples, the force transmission branches (8) form an angle between 70° and 110° with respect to the central axis (Y). Advantageously, said angle range allows an optimal transmission of the force applied on the clamping members (3, 4) towards the catheter catching members (1, 2) and consequently on a catheter caught by the catching members. For example, in the particular case where the force transmission branches (8) form an angle of 90° with respect to the central axis (Y), a force vector of the force applied on the clamping members (3, 4) towards the catheter catching members (1, 2) would be decomposed into, essentially, a directional component pressing the catheter on two diametrically opposite points on its periphery, and another practically negligible force component in any other direction. Furthermore, in examples where the force transmission branches (8) form an angle between 70° and 110° with respect to the central axis (Y), the stability provided by the applicator to the applicator-catheter assembly is maximum, the applicator being able to rest on the surface where the catheter would be inserted, for example a patient's limb, and press on the bearing surface (6) and on the clamping members (3, 4), or on the bearing surface (6) or on the clamping members (3, 4), while connecting the catheter to a connector or while handling a system for releasing a lancet or needle from within a catheter.

In particular examples, the catheter catching members (1, 2) comprise respective circumferential arcs of a cylindrical sleeve (9), as shown in FIG. 2. A circumferential arc allows an optimal fit between the catching members and a catheter proximal portion having a cylindrical or truncated cone shape.

In the particular example of FIG. 2, the applicator is shown comprising two gripping flaps (11) between the clamping members (3, 4) and the bearing surface (6). Two gripping flaps allow a more stable and uniform grip and use of the applicator than in the case when comprising one flap (11).

Figure 3:
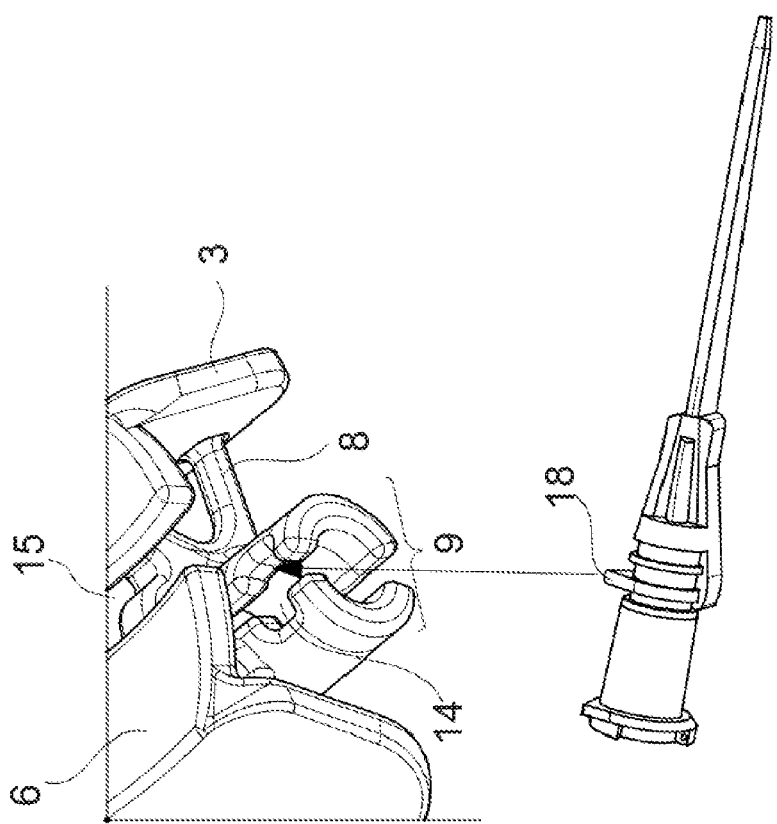
FIG. 3 shows a perspective view of a second example embodiment of an applicator device.

As shown in FIG. 3, in particular examples, the catheter catching members (1, 2) comprise an opening (14) configured for receiving a flange (18) or anti-rotation flange of the catheter proximal portion, in particular of a peripheral venous catheter. Such flange opening or window allows anchoring a catheter through the anti-rotation flange so as to prevent rotation of a catheter caught by the applicator (10) during connection thereof to a connector such as, for example, a serum delivery system, or to a three-way stopcock, or to a plug or to a needleless connector.

Figure 4:
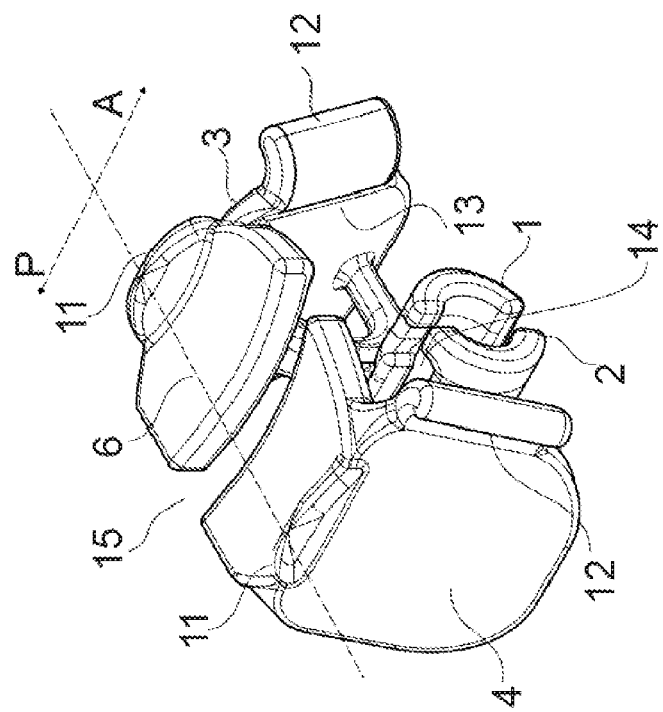
FIG. 4 shows a perspective view of a third example embodiment of an applicator device.

In particular examples, as shown in FIGS. 3 and 4, the clamping members (3, 4) are ergonomically shaped, for example, the clamping members (3, 4) have a concave surface for receiving user's fingers, for applying a catching force, in order to allow the catheter catching members (1, 2) to be brought closer together. Said catching force can be applied by user's fingers covered by sterile or non-sterile gloves. In the case of the use of non-sterile gloves, the applicator (10) enables an aseptic use of a catheter and prevents any microorganisms present on the gloves or on the fingers of a user from reaching the catheter.

In particular examples, as shown in FIG. 4, the bearing surface (6) is ergonomically shaped for applying a pressing force so as to allow the catheter catching members (1, 2) to be moved away from each other. Said ergonomic shape may comprise, for example, a slightly curved shape in a so-called "front" portion (A), shown in FIG. 4, and coinciding with the portion of the applicator (10) under which a catheter proximal portion would be positioned. Said ergonomic shape may comprise, for example, a slightly straight shape of the bearing surface (6) in a so-called "back" portion (P), shown in FIG. 4, and coinciding with the portion of the applicator under which a lancet of a catheter arranged in its insertion position would be positioned. The front portion (A) covers, in particular examples, a first half of the bearing surface (6) and the back portion (P) covers a second half. The front portion (A) covers, in particular examples, one third of the bearing surface (6) and the back portion (P) covers two thirds of the bearing surface (6). In particular examples, the bearing surface (6) is ergonomically shaped with an upper portion slightly concave upwards, a so-called front portion (A) slightly concave forward and a so-called back straight portion (A) coinciding with the portion of the application under which a lancet housing of a catheter is placed in position for insertion, in order to apply a pressing force so as to allow the catheter catching members (1, 2) to move away from each other.

In particular examples, as shown in FIG. 4, at least one of the clamping members (3, 4), comprises at least a second flap (12) on a third end (13). The third end (13) is located at the front portion (A) of the applicator (10). A second flap (12) allows a barrier at the front portion (A) to be formed limiting the area where the user's fingers or robot fingers can operate by holding the applicator by the clamping members (3, 4). Furthermore, a second flap may advantageously be used for tightly catching the catching members (1, 2) so that a catheter can be stably caught.

Advantageously, the fact that the opening (14), the flap (12) and the curved shape of the front portion (A) of the bearing surface (6) are located towards or on the front portion (A), allows references for correctly directing the applicator (10) to be provided, since there is provided a front portion (A) differentiated from the back portion and both are not interchangeable.

The opening (14), configured for receiving a flange or anti-rotation flange of a catheter proximal portion, is also advantageously located at the front portion (A) of the catheter facilitating catheter handling for insertion into a surface. Moreover, the fact that the opening (14) is not located in the centre or in the middle of the catheter but offset to the front portion (A) allows freeing up space at the back portion to facilitate the connection of the catheter to a connector.

Figure 5:
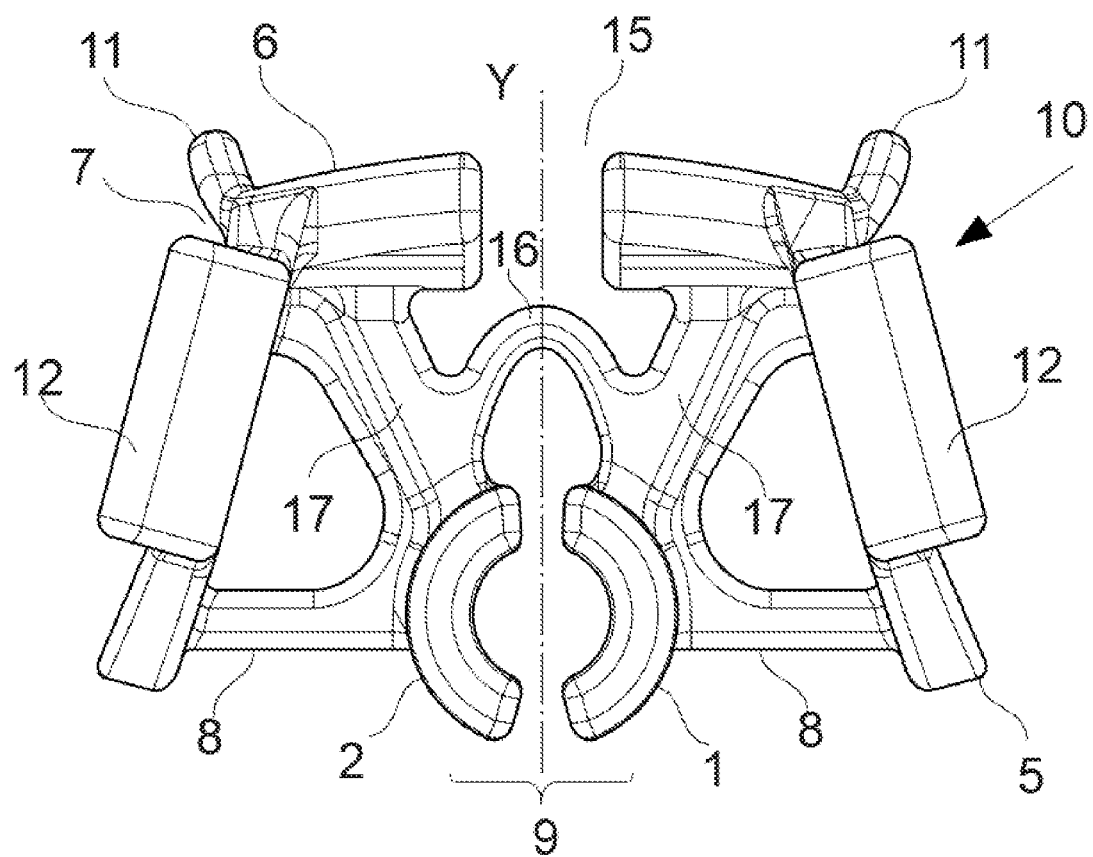
FIG. 5 shows a top view of a fourth example embodiment of an applicator device.

In particular examples, the bearing surface (6) comprises a slit (15) and the catheter catching members (1, 2) are joined through a connecting bridge (16), as shown in FIG. 5. The slit in the bearing surface (6) allows, depending on its width, to open with a predetermined opening the catheter catching members (1, 2). Compared to examples in which the bearing surface does not comprise the slit, a larger opening of the catching members is allowed. Further, the slit

(15) allows, during use of the catheter on a surface, for example on a patient's limb, visibility of the catheter and that limb from a top view above the applicator.

In particular examples, the applicator (10) comprises at least one stability branch (17), also shown in FIG. 5, between at least one catheter catching member (1, 2) and the bearing surface (6). A stability branch (17) ensures that parts comprising the applicator (10) do not to destabilize in use, particularly in the case where a slit is provided in the bearing surface (6).

In a second aspect, a method of use of a catheter applicator (10) disclosed in the present disclosure is provided. The method described below relates to both the use for insertion of the catheter into a surface, and the use for handlings once it is already inserted.

Figure 6:
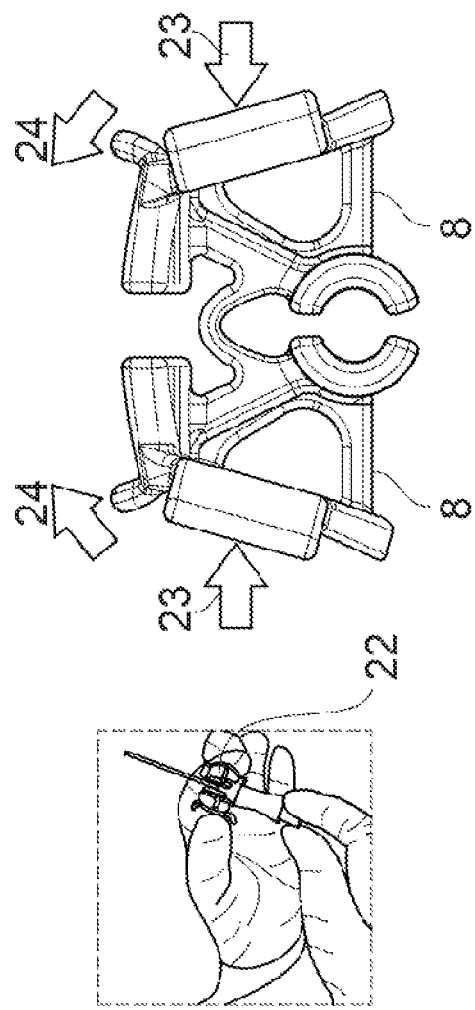
FIG. 6 shows an example of a method of use of a catheter with an applicator device.
Figure 6:
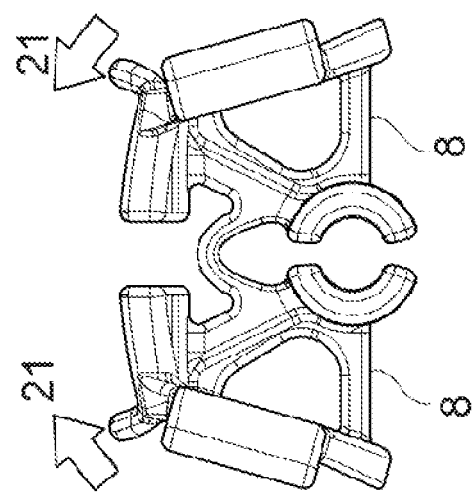

As shown in FIG. 6, the method comprises the steps of:
applying a separating force (21) on the flap (11) so as to allow the catheter catching members (1, 2) to move away from each other;
placing (22) a catheter proximal portion between the catheter catching members (1, 2);
applying a catching force (23) on the clamping members (3, 4) so that the catheter catching members (1, 2) are brought closer together and so that a catheter proximal portion is allowed to be caught.

FIG. 6 shows how the step of applying a catching force (23) on the clamping members (3, 4) is performed by transmitting a force through the force transmission branches (8) from the clamping members (3, 4) to the catheter catching members (1, 2).

The separating force (21) on the flap (11) allows, given the configuration of the applicator (10), a space to be opened between the catching members (1, 2), in the same manner as a first-degree lever would be opened, allowing the insertion or placement or placing (22) of a catheter proximal portion therebetween. Once the catheter is in place, a catching force (23) can be applied such that the catheter would be firmly caught, in the same manner as a third-degree lever would close.

In particular examples the method further comprises the step of applying a separating force on the bearing surface for moving the two catheter catching members away from each other with respect to a central axis (Y) so as to release the catheter proximal portion. Similar to how the separating force (21) would act on the flap (11), the separating force (24) allows, given the configuration of the applicator (10), a space to open between the catching members (1, 2) allowing the catheter to be released.

In particular examples the method comprises, simultaneously with placing (22) a proximal portion of a catheter between the catheter catching members (1, 2), receiving a catheter flange (18) into an opening (14) in the catheter catching members (1, 2). In the case where the applicator (10) comprises an opening (14), a flange (18) in the upper area of the proximal portion of a peripheral venous catheter would be inserted into the opening (14).

Figure 11:
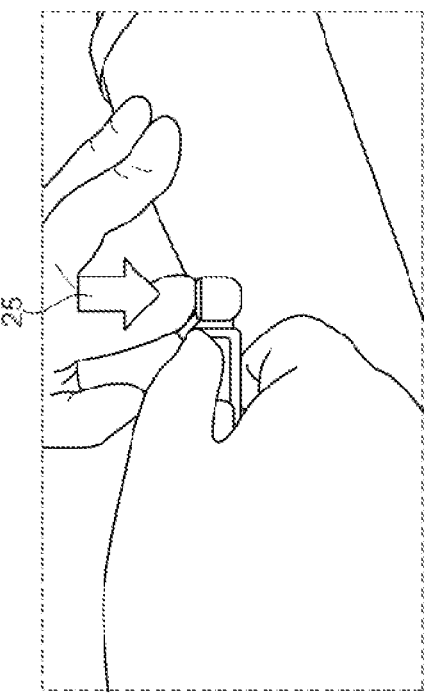
FIG. 11 shows an example use of an applicator device.

In particular examples, the method comprises applying a clamping or pressing force (25) on the bearing surface (6) while handling a system for removing a lancet from within a catheter. Said clamping force (25) or pressure on the bearing surface (6) may be applied as shown in FIG. 11.

In particular examples the method comprises applying an anti-rotational force (26) on the clamping members (3, 4) while connecting a catheter, caught by the applicator, with a connector. Said anti-rotational force would coincide in direction with the catching force (23).

In one example of use, a peripheral venous catheter, an auxiliary device or applicator, a needleless connector, or plug or three-way stopcock, or a serum system is used. The example of use features an anatomical model of a human upper limb, visible in FIGS. 7 through 11. As in a usual catheter insertion procedure, the anatomical model is disinfected, for example, with sterile gauze impregnated with alcohol or chlorhexidine. In order to test the applicator efficiency, the index finger and thumb of a user's first hand, or non-dominant hand, are contaminated by palpation of a coagulase-negative *staphylococcus* culture plate with non-sterile gloves. Although coagulase-negative *staphylococcus* has been used in this test, the purpose of the applicator of the disclosure is to prevent infection with any type of microorganism.

Figure 7:
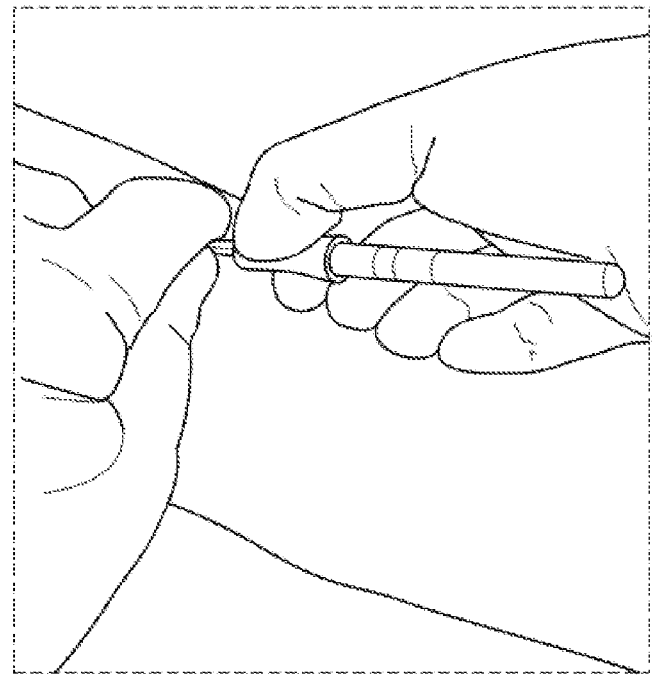
FIG. 7 shows one example of use of a catheter without an applicator device.

In order to compare the case in which the applicator is not used in the catheter insertion, in FIG. 7, and the case in which the applicator according to the disclosure is used, shown in FIGS. 8 to 12, the following is carried out in two ways. The advantages provided by the disclosure are described below.

In a first case, catheter insertion is carried out with non-sterile gloves and without an applicator, as shown in FIG. 7 and, therefore, contaminating or over-contaminating with microorganisms a catheter proximal portion which would be in contact with the proposed anatomical model.

Figure 8:
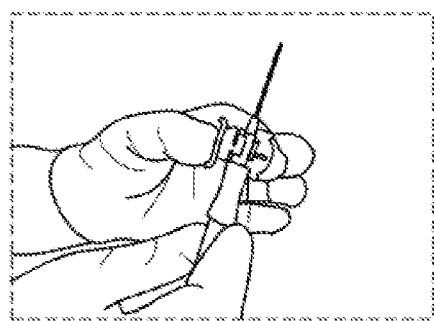
FIG. 8 shows an example use of an applicator device.

Secondly, preparation for insertion with auxiliary device or applicator (10) is carried out with non-sterile and contaminated or over-contaminated gloves. As shown in FIG. 8, the applicator according to the disclosure is placed on the peripheral venous catheter to be inserted by applying a separating force, or on the flaps (11) at their joining area with the clamping members (3, 4), or on the bearing surface (6) so as to allow the catheter catching members (1, 2) to be moved away from each other; in this way, handling of the catching members (1, 2) with the fingers is avoided. A catheter proximal portion is placed between the catheter catching members (1, 2) and a catching force is applied on the clamping members (3, 4) in order to allow the catheter catching members (1, 2) to be brought closer together and to allow the catheter proximal portion to be caught. In this example, a catheter with an anti-rotation flange is used and the opening of the catching members is fitted into the catheter flange.

Figure 9:
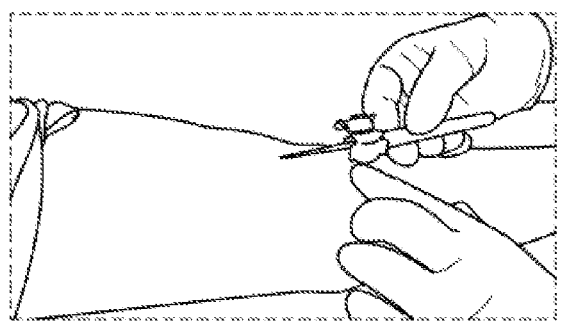
FIG. 9 shows an example use of an applicator device.

Next, as shown in FIG. 9, the catheter is inserted into the anatomical model according to a common technique.

Figure 10:
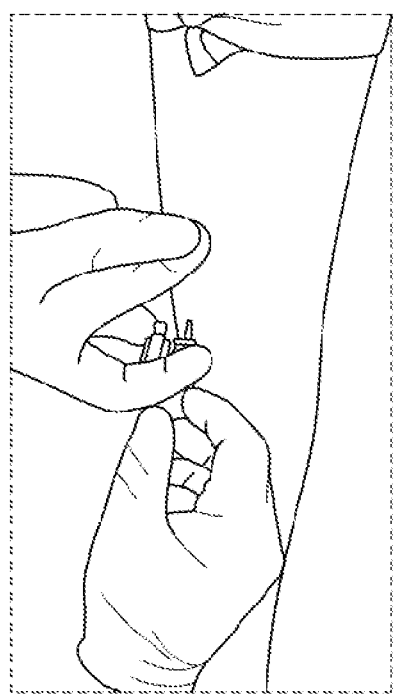
FIG. 10 shows an example use of an applicator device.

FIG. 10 shows how a needle lancet is removed from within the already inserted catheter. In order to prevent the catheter itself from incidentally coming out of the surface where it would remain inserted during this operation, a pressing force (25) shown in FIG. 11 is applied with a finger on the applicator bearing surface (6). Due to the configuration of the applicator, applying a pressing force (25) on the bearing surface (6) allows the clamping members (3, 4) to remain fixed and catching the catheter.

Figure 12:
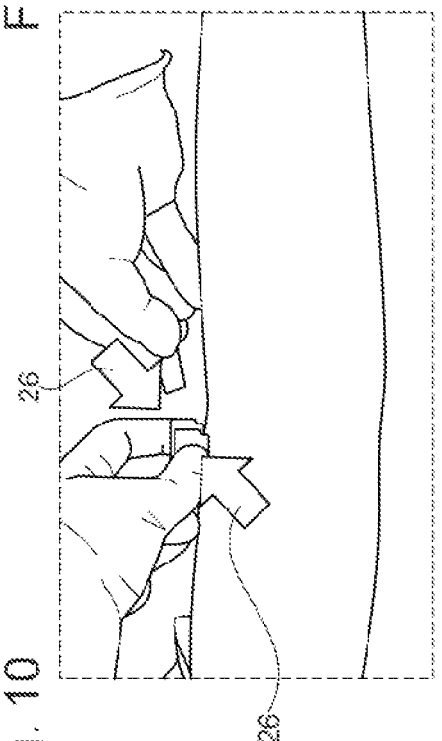
FIG. 12 shows an example use of an applicator device.

FIG. 12 shows how to proceed for connecting the catheter to a connector such as, for example, to a serum system, to a plug, to a needleless connection or to a three-way stopcock. In order to prevent the catheter from rotating on itself when screwing on the connector, a firm anti-rotational force (26) is applied on the device clamping members (3, 4), for example, with the index finger and thumb of a second, or non-dominant hand. Since the applicator is anchored to the catheter flange through the opening (14) said rotational movement is prevented.

Figure 13A:
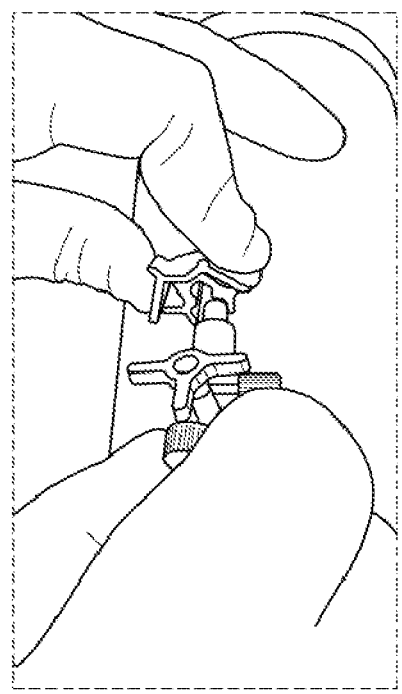
FIGS. 13A and 13B show an example use of the applicator device.
Figure 13B:
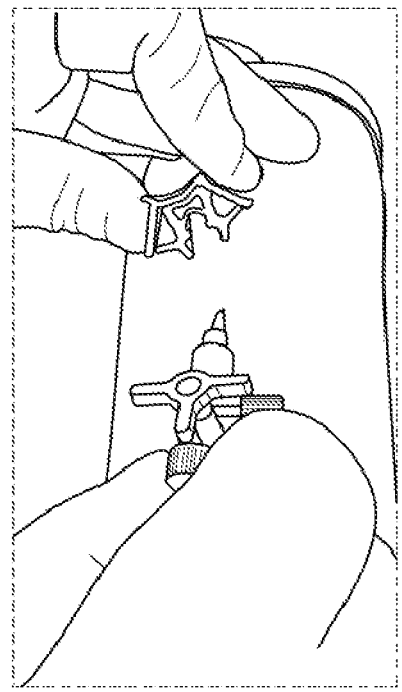

Finally, as shown in FIGS. 13A and 13B, the applicator is released from the already inserted catheter by applying a separating force (24). The separating force is applied on the flap (11), for example, with the index finger and in a complementary manner on a second flap (11) with the user's thumb, to move the two catheter catching members away with respect to a central axis (Y) such that the catheter proximal portion is released. Complementarily or alternatively, the flap (11) may be used simultaneously with a step of applying a clamping or pressing force (25) on the bearing surface (6) in order to facilitate moving the catheter catching members (1, 2) away from each other.

The catheter remains inserted into the anatomical model without, at any time, having been handled the catheter itself with the non-sterile gloves.

Figure 14:
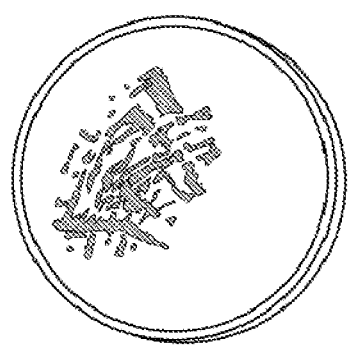
FIG. 14 shows culture results of two catheters, one catheter handled with an applicator device and another catheter handled without an applicator device.

In performing said test, contamination of two catheters, the one handled with applicator, and the one handled without applicator, was compared. Both catheters were removed from the anatomical model by removing them with sterile gloves and both catheters were deposited and rotated using sterile forceps on culture plates that were kept in incubation for 24 hours. FIG. 14 shows the culture results. In the first result seen in the culture plate on the left, corresponding to the catheter with which the applicator was used, it can be seen that after 24 hours the plate remains sterile, and no bacterial growth is observed. In the case of the catheter in which no device was used, in the plate on the right, bacterial growth would be represented by light lines on the dark surface of the plates, where the light lines show bacterial growth in 24 hours. The plate on the right therefore shows coagulase-negative *staphylococcus* bacteria growth with which the gloves had been contaminated or over-contaminated just prior to insertion of the peripheral venous catheter into the anatomical model. FIG. 14 would show the effectiveness of the applicator for aseptic catheter insertion. Furthermore, as described, not only aseptic insertion and handling is allowed by the applicator of the disclosure but also optimized handling thanks to the cooperation between the bearing surface (6) and the clamping and catching members.

What is claimed is:

1. A catheter applicator comprising:
   first and second catching members that are cooperatively configured to retain a proximal portion of a catheter having a flange, the first and second catching members being symmetrically located on opposite sides a central axis of the catheter applicator, and each of the first and second catching members comprising an opening configured for receiving the flange;
   first and second clamping members that are symmetrically separated with respect to the central axis, each of the first and second clamping members having a first end that is respectively coupled to the first and second catching members through respective first and seconds force transmission branches;
   a bearing surface joined to respective second ends of the first and second clamping members, the bearing surface forming an angle between 70° and 110° with respect to the central axis, at least a portion of each of the first and second clamping members being located between the first and second catching members and the bearing surface, the bearing surface and the first and second clamping members being configured to cooperate to cause the first and second catheter catching members to be brought closer together so as to allow the catheter to be caught and to allow the catheter catching members to move away from one another so as to permit the catheter to be released; and
   a first gripping flap located between the first clamping member and the bearing surface and a second gripping flap located between the second clamping member and the bearing surface.

2. The catheter applicator according to claim 1, wherein the each of the first and second force transmission branches forms an angle between 70° and 110° with respect to the central axis.

3. The catheter applicator according to claim 1, wherein the first and second catching members comprise respective circumference arcs of a cylindrical sleeve.

4. The catheter applicator according to claim 1, wherein the first and second catching members comprise an opening located at a front portion, the front portion coinciding with a portion of the catheter applicator under which, in use, the proximal portion of the catheter is positioned.

5. The catheter applicator according to claim 1, wherein each of the first and second clamping members has a concave surface for applying a catching force.

6. The catheter applicator according to claim 1, wherein the bearing surface has an upper portion that concaves upwards, a front portion that concaves forward, and a straight back portion coinciding with a portion of the catheter applicator under which a lancet housing of the catheter would be placed.

7. The catheter applicator according to claim 1, further comprising a third gripping flap at a third end of the first clamping member and a fourth griping flap at a third end of the second clamping members.

8. The catheter applicator according to claim 1, wherein the bearing surface comprises a slit and the first and second catching members are joined by a connecting bridge.

9. The catheter applicator according to claim 1, further comprising at least one stability branch extending between at least one of the first and second catching member and the bearing surface.

10. A method of use of the catheter applicator of claim 1, the method comprising:
    applying a separating force on each of the first and second gripping flaps to cause the first and second catheter catching members to move away from one another;
    placing the proximal portion of the catheter between the first and second catching members; and
    applying a catching force on each of the first and second clamping members to cause a force to be transmitted respectively through the first and second force transmission branches towards the respective first and second catching members such the first and second catching members are brought closer together to catch the proximal portion of the catheter.

11. The method according to claim 10, further comprising applying a separating force on each of the first and second gripping flaps to cause the first and second catching members to release the proximal portion of the catheter.

12. The method according to claim 10, further comprising housing the flange of the catheter in the opening.

13. The method according to claim 10, further comprises applying a clamping force on the bearing surface while removing a lancet from within a catheter.

14. The method as claimed in the claim 10, further comprising applying an anti-rotational force on the first and second clamping members while connecting the catheter, caught between the first and second catching members, with a connector.

15. A method of use of a catheter applicator, wherein the catheter applicator comprises:

first and second catching members that are cooperatively configured to retain a proximal portion of a catheter, the first and second catching members being symmetrically located on opposite sides a central axis of the catheter applicator;

first and second clamping members that are symmetrically separated with respect to the central axis, each of the first and second clamping members having a first end that is respectively coupled to the first and second catching members through respective first and seconds force transmission branches;

a bearing surface joined to respective second ends of the first and second clamping members, the bearing surface forming an angle between 70° and 110° with respect to the central axis, at least a portion of each of the first and second clamping members being located between the first and second catching members and the bearing surface, the bearing surface and the first and second clamping members being configured to cooperate to cause the first and second catheter catching members to be brought closer together so as to allow the catheter to be caught and to allow the catheter catching members to move away from one another so as to permit the catheter to be released; and a first gripping flap located between the first clamping member and the bearing surface and a second gripping flap located between the second clamping member and the bearing surface, the method comprising:

applying a separating force on each of the first and second gripping flaps to cause the first and second catheter catching members to move away from one another;

placing the proximal portion of the catheter between the first and second catching members; and applying a catching force on each of the first and second clamping members to cause a force to be transmitted respectively through the first and second force transmission branches towards the respective first and second catching members such the first and second catching members are brought closer together to catch the proximal portion of the catheter.

16. The method according to claim 15, further comprising applying a separating force on each of the first and second gripping flaps to cause the first and second catching members to release the proximal portion of the catheter.

17. The method according to claim 15, further comprising housing the flange of the catheter in the opening.

18. The method according to claim 15, further comprises applying a clamping force on the bearing surface while removing a lancet from within a catheter.

19. The method as claimed in the claim 15, further comprising applying an anti-rotational force on the first and second clamping members while connecting the catheter, caught between the first and second catching members, with a connector.

* * * * *